United States Patent
Gerard et al.

(10) Patent No.: US 6,192,368 B1
(45) Date of Patent: Feb. 20, 2001

(54) APPARATUS AND METHOD FOR AUTOMATICALLY PROPAGATING A CHANGE MADE TO AT LEAST ONE OF A PLURALITY OF OBJECTS TO AT LEAST ONE DATA STRUCTURE CONTAINING DATA RELATING TO THE PLURALITY OF OBJECTS

(75) Inventors: Scott Neal Gerard; Steven Lester Halter; Steven J. Munroe; Robert Eugene Westland, all of Rochester, MN (US)

(73) Assignee: International Business Machines Corporation, Armonk, NY (US)

(*) Notice: Under 35 U.S.C. 154(b), the term of this patent shall be extended for 0 days.

(21) Appl. No.: 09/022,145

(22) Filed: Feb. 11, 1998

(51) Int. Cl.$^7$ .................................................. G06F 17/30
(52) U.S. Cl. ........................................................ 707/103
(58) Field of Search .................... 707/103, 204, 707/8, 201, 104, 6

(56) References Cited

U.S. PATENT DOCUMENTS

| | | | | |
|---|---|---|---|---|
| 5,129,083 | * | 7/1992 | Cutler et al. | 707/103 |
| 5,136,707 | * | 8/1992 | Block et al. | 707/103 |
| 5,317,730 | * | 5/1994 | Moore et al. | 707/103 |
| 5,404,525 | | 4/1995 | Endicott et al. | 395/700 |
| 5,692,183 | * | 11/1997 | Hapner et al. | 707/103 |
| 5,758,347 | * | 5/1998 | Lo et al. | 707/103 |
| 5,787,425 | * | 7/1998 | Bigus | 707/6 |
| 5,809,507 | * | 9/1998 | Cavanaugh | 707/103 |
| 5,848,419 | * | 12/1998 | Hapner et al. | 707/103 |
| 5,864,866 | * | 1/1999 | Henckel et al. | 707/103 |
| 5,870,761 | * | 2/1999 | Demers et al. | 707/201 |
| 5,915,252 | * | 6/1999 | Misheski et al. | 707/103 |
| 5,926,819 | * | 7/1999 | Doo et al. | 707/104 |
| 5,937,189 | * | 8/1999 | Branson et al. | 395/701 |
| 5,956,718 | * | 9/1999 | Prasad et al. | 707/10 |
| 5,970,498 | * | 10/1999 | Duffield et al. | 707/104 |
| 5,978,785 | * | 11/1999 | Johnson et al. | 706/54 |
| 5,983,234 | * | 11/1999 | Tietjen et al. | 707/103 |
| 6,014,637 | * | 1/2000 | Fell et al. | 705/26 |
| 6,016,495 | * | 1/2000 | McKeehan et al. | 707/103 |

\* cited by examiner

*Primary Examiner*—Hosain T. Alam
*Assistant Examiner*—Jean M. Corrielus
(74) *Attorney, Agent, or Firm*—Martin & Associates, L.L.C.; Derek P. Martin

(57) ABSTRACT

According to the present invention, an object change manager includes methods afterCreation( ), beforeDeletion( ), beforeChange( ) and afterChange( ) that may be invoked when an object is changed. The object change manager automatically updates all data structures, such as indexes and has tables, that correspond to the object being changed when one of these methods is called. The object change manager is an extensible framework that allows a programmer to define custom change management environments. The object change manager of the preferred embodiments is a portion of code that automatically propagates changes to objects to their corresponding data structures in a way that is transparent to the programmer, without requiring excessive overhead in the object infrastructure code.

19 Claims, 6 Drawing Sheets

APPARATUS AND METHOD FOR AUTOMATICALLY PROPAGATING A CHANGE MADE TO AT LEAST ONE OF A PLURALITY OF OBJECTS TO AT LEAST ONE DATA STRUCTURE CONTAINING DATA RELATING TO THE PLURALITY OF OBJECTS

BACKGROUND OF THE INVENTION

1. Technical Field

This invention generally relates to the data processing field. More specifically, this invention relates to the field of modifying objects in an object-oriented system.

2. Background Art

The development of the EDVAC computer system of 1948 is often cited as the beginning of the computer era. Since that time computers have become indispensable in many fields of human endeavor including engineering design, machine and process control, and information storage and access. One of the primary uses of computers is for information storage and retrieval.

Database systems have been developed that allow a computer to store a large amount of information in a way that allows a user to search for specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database. A database manager within the database system is responsible for storing and retrieving all information in the database in a way that allows random access to any policy holder within the database. One way for the database manager to store and retrieve information for policy holders is to build a data structure that correlates database entries to their location in the database. One example of such a data structure is an index of policy holders. An index correlates policy holders to the records in the database that contain the information that corresponds to the policy holders. Thus, when a new entry is created in the database, the database manager creates an entry in the index that corresponds to the new entry, and that identifies the location of the information in the database. In this way, when the information for a specific policy holder is required, the index is searched, and when the proper policy holder is found in the index, data is read that indicates the location in the database of the information for that particular policy holder.

Modern database management techniques make possible relational databases that have very powerful storage and retrieval mechanisms. When information needs to be added to a database, a database manager creates one or more records in the database, stores the information in the record (s), and update any indexes or other data structures to reflect the new data. The database manager thus assures that all indexes or other data structures that correlate to the data stored in the database are updated as required when changes are made to data in the database, but does so at the expense of significant overhead in storing and retrieving data to and from the database.

Advances in computer hardware and software have pushed the performance of modern computer systems to higher limits. One of the recent advances in the field of software development has been the emergence of object oriented programming technology. The goal of using object-oriented programming is to create small, reusable sections of program code known as objects that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a group of well-tested objects, a more stable, uniform, and consistent approach to developing new computer programs can be achieved.

An object in an object-oriented computer program typically has attributes defined by state data that determine how the object will behave. When a program changes an object's state data, data structures that correspond to the object must be updated to reflect the change. For example, if an employee gives birth to a child, changing the employee object to include the name of the child should cause a corresponding change in an index that tracks the number of dependents that each employee has. In the database realm, a change to the database is made by the database manager, which also updates the data structures to reflect the change. However, in an object oriented realm, many different objects may make changes to a particular object, and there is currently no architected mechanism in place to assure that data structures are updated when an object is changed.

One approach to assuring that changes to an object are reflected in corresponding data structures is to require a programmer to write his or her program in a way that updates all data structures whenever an object is changed. For example, special code could be added into every method that changes an object's data to signal index maintenance code to update the indexes with the change that was just made. However, this approach puts too much of a burden on the programmer. Furthermore, the programmer may forget or choose not to implement these requirements into the code, so the index updating is only as reliable as the programmer. It is more desirable to have the system keep track of updating indexes, which would relieve the programmer of these programming constraints, and would also assure that data structures are automatically updated when an object is changed in a manner that is transparent to the programmer.

Another approach is to put all index maintenance code in the object infrastructure code, thereby assuring that changes to objects are reflected in the corresponding data structures. However, this approach requires excessive development resources, because the object infrastructure code would have to provide a language to describe logical conditions for selecting and omitting objects, for creating computed key fields, etc. In addition, this approach imposes too many policy and implementation details into the object infrastructure code. Furthermore, this approach would not allow programmers to modify the way that changes to objects are reflected in the corresponding data structures. Without a simple, flexible, user-extensible mechanism for automatically changing data structures such as an index when an object is changed, the computer industry will continue to suffer from object oriented systems that either impose excessive requirements on programmers, or that provide excessively rigid code in the object infrastructure.

SUMMARY OF THE INVENTION

According to the present invention, an object change manager includes methods afterCreation( ), beforeDeletion( ), beforeChange( ) and afterChange( ) that are invoked as an object is changed. The object change manager automatically updates all data structures, such as indexes and hash tables, that correspond to the object being changed when one of these methods is called. The object change manager is an extensible framework that allows a programmer to define custom change management environments. The object change manager of the preferred embodiments is a portion of code that automatically propagates changes to objects to their corresponding data structures in a way that is transparent to the programmer, without requiring excessive overhead in the object infrastructure code.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
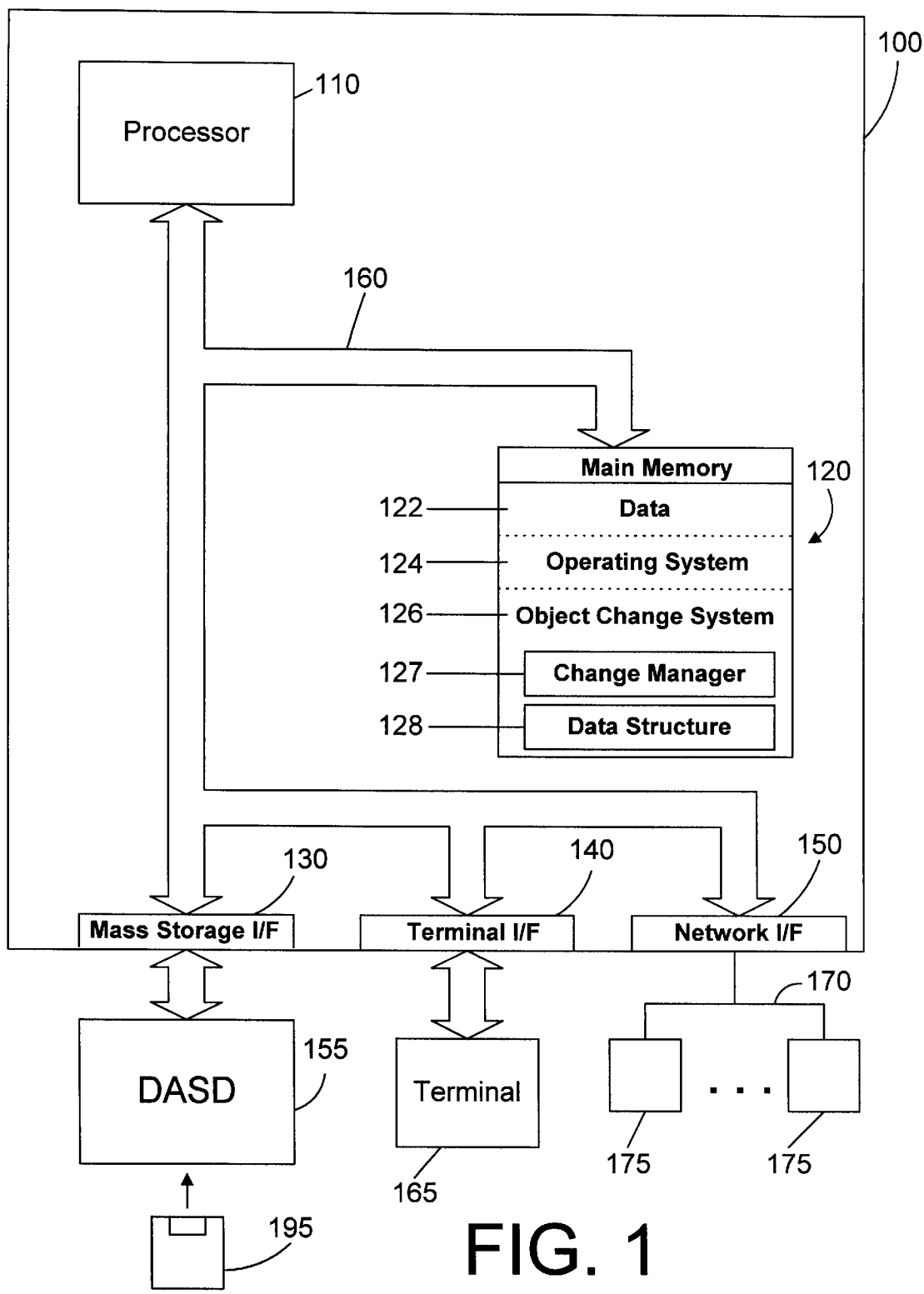
FIG. 1 is a block diagram of an apparatus in accordance with a preferred embodiment of the present invention.

The present invention is accomplished through the use of object oriented programming concepts. For those who are not familiar with object oriented programming concepts, the brief overview below provides background information that will help the reader to understand the present invention.
1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology. The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

A central concept in object oriented programming is the "class." A class is a template that defines a type of object. A class outlines or describes the characteristics or makeup of objects that belong to that class. By defining a class, objects can be created that belong to the class without having to rewrite the entire definition for each new object as it is created. This feature of object oriented programming promotes the reusability of existing object definitions and promotes more efficient use of program code.

Although object-oriented programming offers significant improvements over other programming types, program development still requires significant amounts of time and effort, especially if no preexisting objects are available as a starting point. Consequently, one approach has been to provide a program developer with a set of pre-defined, interconnected classes that create a set of objects. Such pre-defined classes and libraries are typically called object frameworks. Frameworks essentially provide a prefabricated structure for a working program by defining certain classes, class relationships, and methods that a programmer may easily use by appropriate subclassing to generate a new object-oriented program.

There are many computer languages that presently support object oriented programming techniques. For example, Smalltalk, Object Pascal, C++ and Java are all examples of programming languages that support object oriented programming to one degree or another.
2. Detailed Description Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, and an object change system 126. Object change system 126 includes a change manager 127 and one or more corresponding data structures 128. Computer system 100 utilizes well known virtual addressing mechanisms that allow the programs of computer system, 100 to behave as if they only have access to a large, single storage entity instead of access to multiple, smaller storage entities such as main memory 120 and DASD device 155. Therefore, while data 122, operating system 124, and object change system 126, including change manager 127 and data structure 128, are shown to reside in main memory 120, those skilled in the art will recognize that these programs are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Operating system 124 is a multitasking operating system known in the industry as OS/400; however, those skilled in the art will appreciate that the spirit and scope of the present invention is not limited to any one operating system. Operating system 124 preferably supports an object oriented programming environment such as that provided, for example, by the Java programming language.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions of object change system 126 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
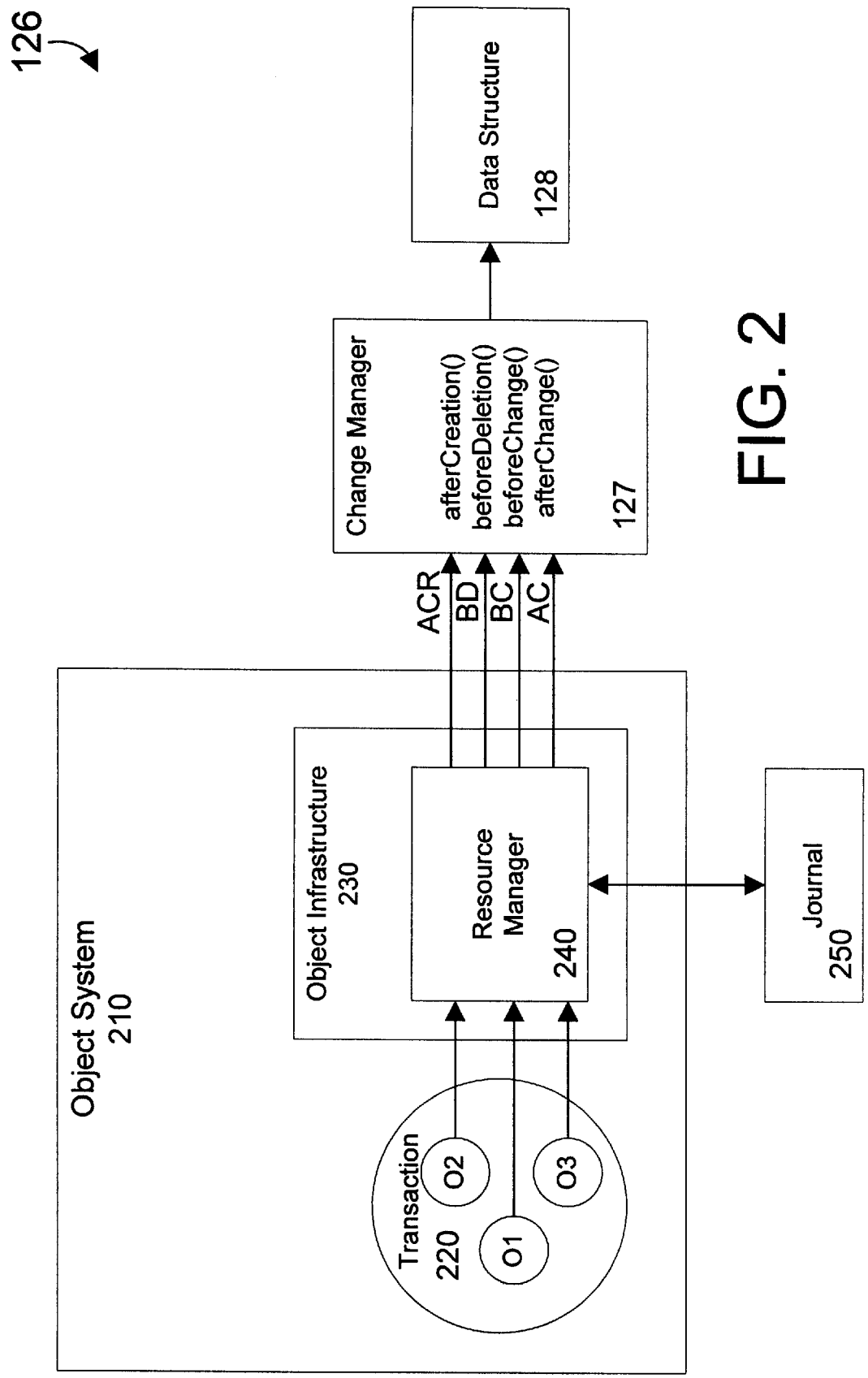
FIG. 2 is a block diagram of the object change system of FIG. 1.

The remainder of this specification describes the details of object change system 126 in FIG. 1. Referring now to FIG. 2, object change system 126 includes an object system 210, a journal 250, a change manager 127, and a data structure 128. Data structure 128 is representative of one or more data structures that contain data corresponding to objects in object system 210. For example, suitable data structures include: indexes, hash tables, and priority queues. Of course, other forms of data structures that currently exist or are derived in the future are all encompassed within the scope of the preferred embodiments. Furthermore, while a single data structure 128 is illustrated in the figures, the preferred embodiment expressly anticipates the use of multiple data structures within the scope of the present invention.

Object system 210 includes a transaction 220 and an object infrastructure 230. Transaction 220 includes multiple objects, represented for illustrative purposes as object 1 (O1), object 2 (O2), and object 3 (O3). In the preferred embodiment of the invention, change system 126 is transaction-based, which is discussed in more detail below, giving rise to one or more transactions 220 within object system 210. Object infrastructure 230 represents system-level code that determines how objects in a system behave and interact. Object infrastructure 230 includes a resource manager 240. The concepts relating to resource managers in object infrastructure code are well-known in the art, and are not discussed herein at length. For our discussion herein, we assume that a change manager 127 is known to or registered to the resource manager 240.

When objects 1, 2 or 3 in transaction 220 change, those changes are detected by resource manager 240, which then notifies the change manager 127, which updates corresponding data structure 128. Resource manager 240 notifies change manager 127 of changes to objects by invoking one of four methods on change manager 127: afterCreation( ), beforeDeletion( ) beforeChange( ), and afterChange( ). When each of these methods are called, the changed object is passed as a parameter. Of course, one skilled in the are will realize that these four methods may be implemented as a single method with an additional parameter to specify the desired function, or in other ways. The present invention extends to any way of implementing the afterCreation( ), beforeDeletion( ), beforeChange( ), and afterChange( ) functions represented by the corresponding methods discussed herein.

Resource manager 240 calls the afterCreation( ) method after an object is allocated and constructed. Change manager 127 extracts the data in the new object and uses the new data to add one or more entries into the corresponding data structure 128. Resource manager 240 calls the beforeDeletion( ) method before an object is deleted. Change manager 127 extracts the data from the object, and removes one or more entries from the corresponding data structure 128. Resource manager 240 calls the beforeChange( ) method before an object is changed. Change manager 127 extracts the data from the object, and uses the data to remove entries in the data structure that correspond to the data.

Resource manager 240 calls the afterChange( ) method after an object has been changed. Change manager 127 extracts the data from the object, and uses the data to update data structure 128 as required by the changed data.

When resource manager 240 calls the methods afterCreation( ), beforeDeletion( ), beforeChange( ), and afterChange( ), it also stores state information for the object in a journal 250. Journal 250 is a file that stores state data for objects. Journal 250 is kept to record the state of objects so that the objects may revert back to a previous state, if needed. A copy of the object's state data before any changes are made to the object is known as a "before image". A copy of the object's state data after the changes are made to the object is known as an "after image". The resource manager stores a before image when calling beforeChange( ) and beforeDeletion( ), and stores an after image when calling afterChange( ) and afterCreation( ). If the system crashes, the before and after images in journal 250 are used to restore the object's state when the system comes back up. If an object is changed in a transaction, but the transaction is halted or is aborted prior to completing the transaction, it is then necessary to restore the previous state of the object from the before and after images stored in journal 250.

Figure 3:
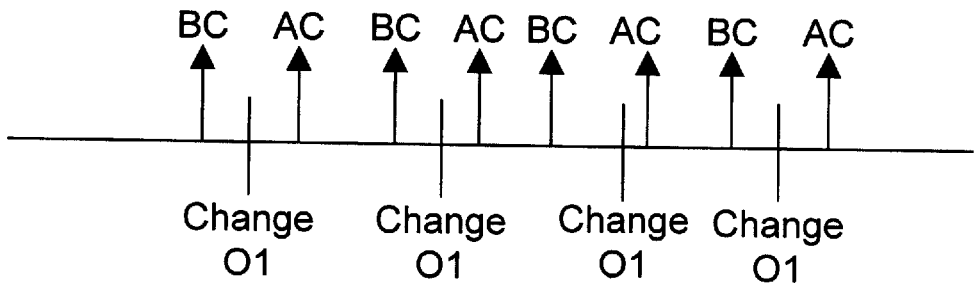
FIG. 3 is a timing diagram showing how changes to an object are tracked on a change-by-change basis.
Figure 4:
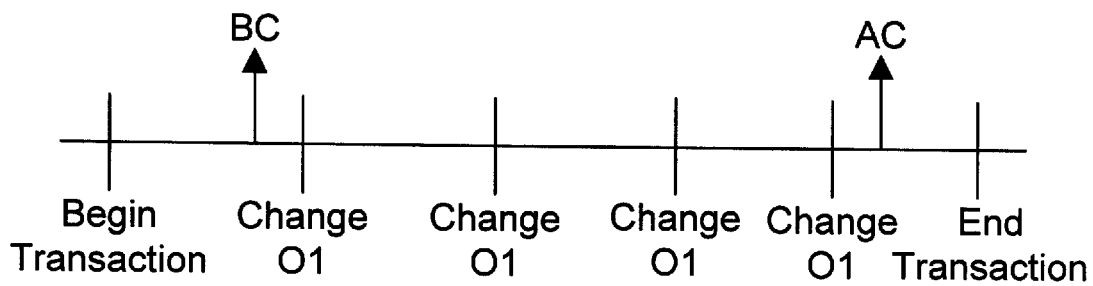
FIG. 4 is a timing diagram showing how changes to an object are tracked on a transaction basis.
Figure 5:
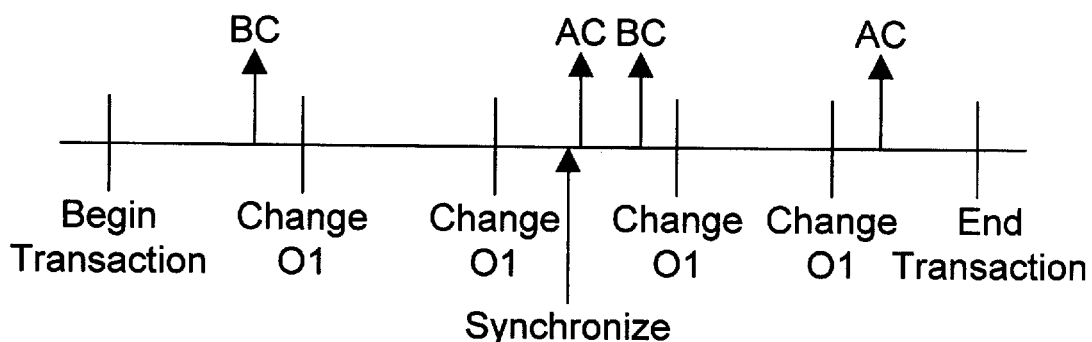
FIG. 5 is a timing diagram showing how changes to an object are tracked on a transaction basis with changes synchronized in the middle of the transaction.

The resource manager 240 invokes the beforeChange( ) and afterChange( ) methods at times that depend on whether or not the changed object is running under transaction control. Referring to FIG. 3, a sample timeline of changes to object 1 (O1) is shown, which includes four changes to object 1, and various calls to the beforeChange( ) and afterChange( ) methods, labeled BC and AC, respectively. If object 1 is not running under transaction control, resource manager 240 must invoke the beforeChange( ) method before each change to object 1, and must invoke the afterChange( ) method after each change to object 1, as shown in FIG. 3. Referring to FIG. 4, if, however, object 1 is running under transaction control, resource manager 240 need only invoke the beforeChange( ) method before the first change in the transaction, and the afterChange( ) method after the last change in the transaction. A transaction-based resource manager will therefore drastically cut down on the system overhead required to track object changes by not requiring all of the intermediate beforeChange( ) and afterChange( ) method calls in the middle of a transaction. As described above, the preferred embodiment of the present invention is transaction-based to cut down on the overhead required to propagate changes to objects to be reflected in their corresponding data structures. Note, as shown in FIG. 5, that there may be times when the changes need to be synchronized in the middle of a transaction. To synchronize the changes during a transaction, the afterChange( ) method is invoked after the synchronization point, and the beforeChange( ) method is invoked anew before the following change.

Figure 6:
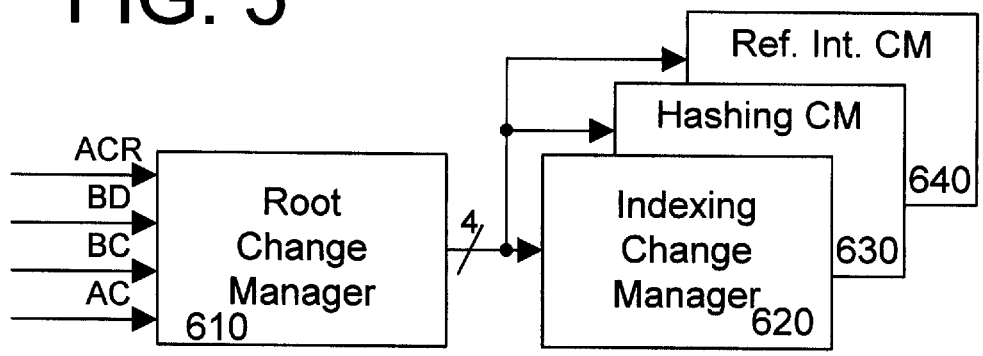
FIG. 6 is a block diagram of a change manager than fans out to several other change managers.

While change manager 127 is shown as a single entity in FIGS. 1 and 2, change manager 127 may actually be comprised of multiple change managers. One example configuration is shown in FIG. 6, which shows a single root change manager 610 that receives method calls from resource manager 240, and then passes these method calls as appropriate to various other change managers, such as indexing change manager 620, hashing change manager 630, and referential integrity change manager 640. For the sake of simplicity, the preferred embodiments herein show resource manager 240 communicating with a single root change manager 610, which can then communicate with other change managers, as required. While resource manager 240 could communicate with multiple change managers within the scope of the present invention, the best mode of the invention only requires resource manager 240 to communicate with one change manager, the root change manager 610, which can then delegate the calls to other change managers, as appropriate.

Thus, according to a preferred embodiment of the present invention, an apparatus and method automatically update data structures that correspond to object data when the object data is changed. Resource manager 240 in the object infrastructure code calls methods on root change manager 610 to cause other change managers to perform the desired updates. Resource manager 240 interacts with a single root change manager, which may fan out to other change managers as defined by a programmer that extends the change manager to create a specific change management environment.

Figure 7:
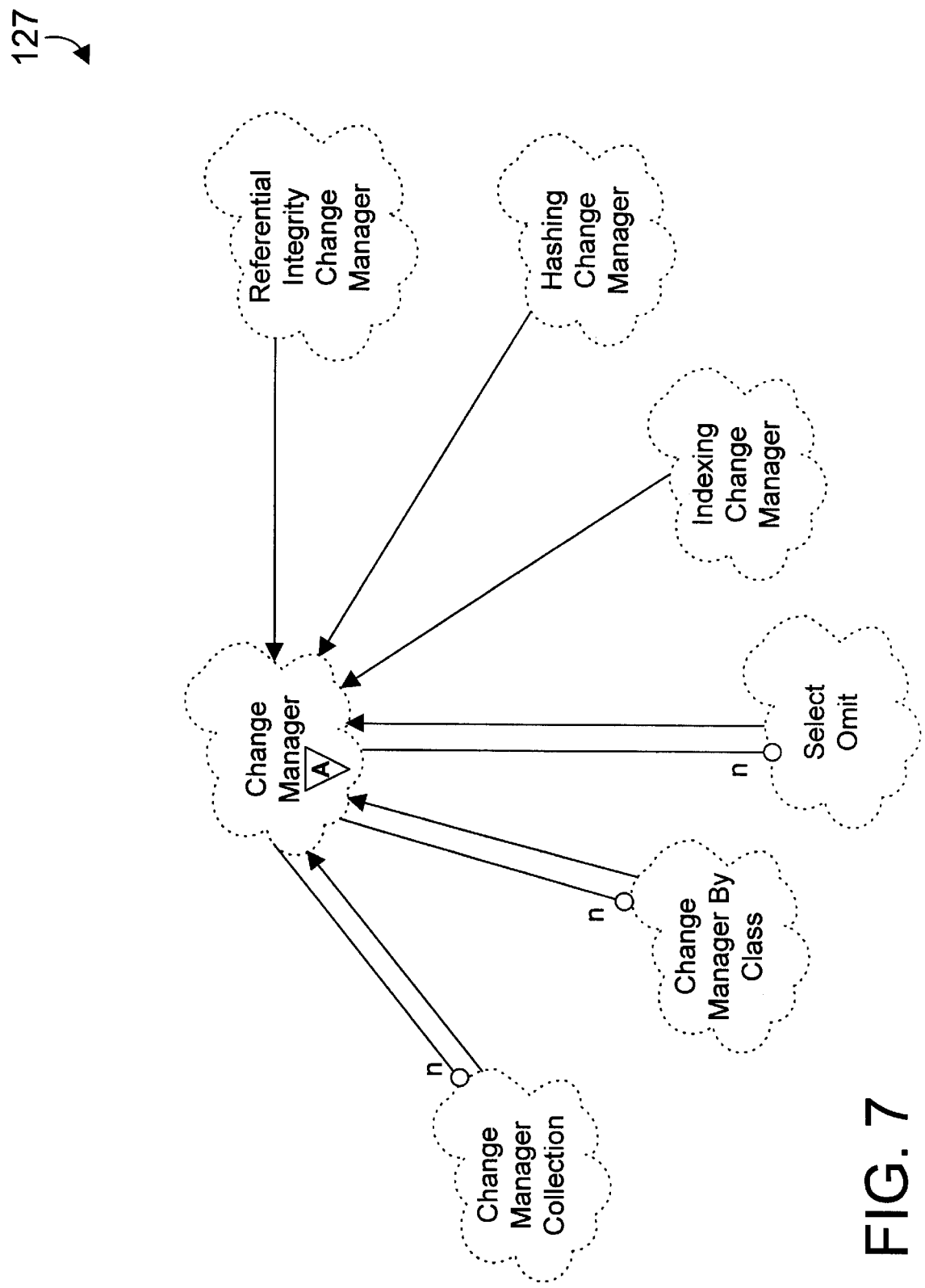
FIG. 7 is a class diagram of an extensible change manager.

Referring now to FIG. 7, change manager 127 in accordance with the preferred embodiment is an extensible framework mechanism that allows a programmer to configure change manager 127 according to the specific needs and requirements of a particular system. Change manager 127 includes a change manager class, which is an abstract class. This means that change manager 127 must be extended by a programmer to provide concrete subclasses that perform according to the parameters set by the programmer. Examples of some concrete subclasses are ChangeManagerCollection, ChangeManagerByClass, SelectOmit, IndexingChangeManager, HashingChangeManager, and ReferentialIntegrityChangeManager. Note that IndexingChangeManager, HashingChangeManager, and ReferentialIntegrityChangeManager are classes that correspond to the Index Change Manager 620, Hashing Change Manager 630, and Ref. Int. Change Manager 640 of FIG. 6.

ChangeManagerCollection is a class that defines a collection of change managers, and this explains the "uses" relationship between the ChangeManagerCollection class and the ChangeManager class. ChangeManagerByClass is a class that uses multiple change managers that act upon objects depending on the class of that object. ChangeManagerByClass also has a "uses" relationship with the ChangeManager class, indicating that ChangeManagerByClass may use multiple change managers. The SelectOmit class defines a particular type of change manager that performs a filter function by passing on some method calls to other change managers, and by blocking some method calls. For example, if a data structure 128 only cares about one particular piece of data within an object, a SelectOmit change manager may be provided to pass on the method calls when the particular piece of data is affected, and to not pass on all other method calls that affect other data within the object. SelectOmit also has a "uses" relationship with the ChangeManager, indicating that a SelectOmit object may contain multiple change managers.

The ReferentialIntegrityChangeManager class does not actually update a data structure, but is used to ensure that objects are only changed in certain user-defined ways. ReferentialIntegrityChangeManager includes one or more user-defined tests that must be satisfied before a change to an object is allowed. If the change to an object passes these tests, the ReferentialIntegrityChangeManager returns, indicating that the change is allowable. If the change to an object fails these tests, the ReferentialIntegrityChangeManager causes the entire transaction to rollback, thereby not allowing the change to the object.

Note that all of the subclasses of the ChangeManager class in FIG. 7 are suitable examples of concrete subclasses that a programmer might want to provide. Many other possible concrete subclasses for a variety of different applications are possible within the scope of the preferred embodiments.

Figure 8:
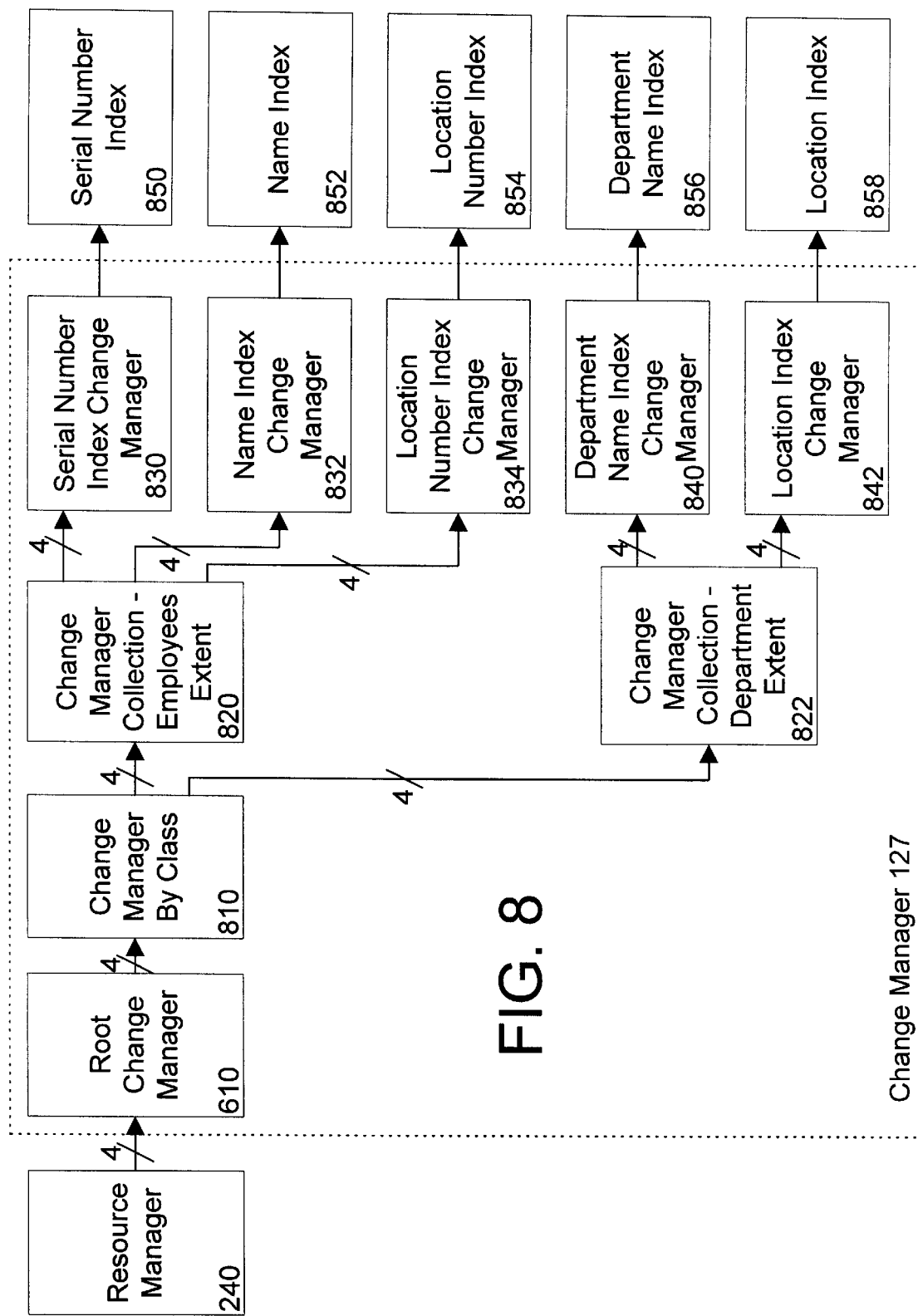
FIG. 8 is a block diagram showing an example of how a user may extend the change manager of FIG. 7 to achieve a particular change management environment.

The power of providing change manager 127 as an extensible framework as shown in FIG. 7 is shown by a specific change management environment in FIG. 8 that is defined by a user appropriately extending the change manager class of FIG. 7. As described above, resource manager 240 preferably interacts with a single root change manager 610. The root change manager 610 in turn interacts with all change managers registered to it. In this specific example, ChangeManagerByClass 810 is the only change manager registered to root change manager 610. Note that the connection between resource manager 240 is via the four method calls discussed above, namely afterCreation( ), beforeDeletion( ), beforeChange( ), and afterChange( ). Change manager by class 810 passes on these method calls according to the class of the object affected. The example of FIG. 8 assumes two different classes of objects, namely Employees and Department. All methods that affect objects that are instantiated under the Employee class are routed to change manager collection 820 for the employees extent, while all methods that affect objects that are instantiated under the Department class are routed to change manager collection 822 for the department extent. In this context, an extent may be a deep extent or a shallow extent. A deep extent is a set of instances of a class and its subclasses that reside in a specific datastore. A shallow extent is a set of instances of a class that reside in a specific datastore, and does not include subclasses. Change manager collection 820 for the employees extent thus contains a set, such as a list, of all the instances of the Employee class that reside in the datastore where employee objects are stored. Change manager collection 822 for the department extent contains a set, such as a list, of all the instances of the Department class that reside in the datastore where department objects are stored.

The change manager collection 820 for the employees extent routes the method calls it receives to each of: serial number index change manager 830, name index change manager 832, and location number index change manager 834. Each of these change managers only act upon method calls that affect the index they manage. Thus, the serial number index change manager 830 will only act upon a method call that requires that the serial number index 850 be updated. In similar fashion, the name index change manager 832 and location number index change manager 834 will only act upon a method call that requires that the name index 852 or location number index 854, respectively, be updated.

Change manager collection 822 for the department extent routes the method calls it receives to each of the department name index change manager 840 and the location index change manager 842. Each of these change managers 840 and 842 only act upon method calls that require that their respective indexes 856 and 858 be updated.

Note that the preferred implementation of change manager 127 in FIG. 8 has change manager by class 810 route method calls to either change manager collection 820 or 822. Change manager collection 820 is called for all employee objects. Change manager collection 822 is called for all department objects. Only one of these is called for a given object because an object cannot be an instance of two classes. Change manager collection 820 routes method calls to each of its change managers 830, 832 and 834, and change manager collection 822 routes method calls to each of its change managers 840 and 842.

For the specific example illustrated in FIG. 8, each change manager 830, 832, 834, 840 and 842 are shown as separate from the indexes they update, namely 850, 852, 854, 856, and 858. However, one skilled in the art will realize that this is a choice of implementation, and a change manager could be implemented as an integral part of the index code itself. If this were the case, the serial number index change manager 830 of FIG. 8 would simply be a logical block within the index block 850.

Figure 9:
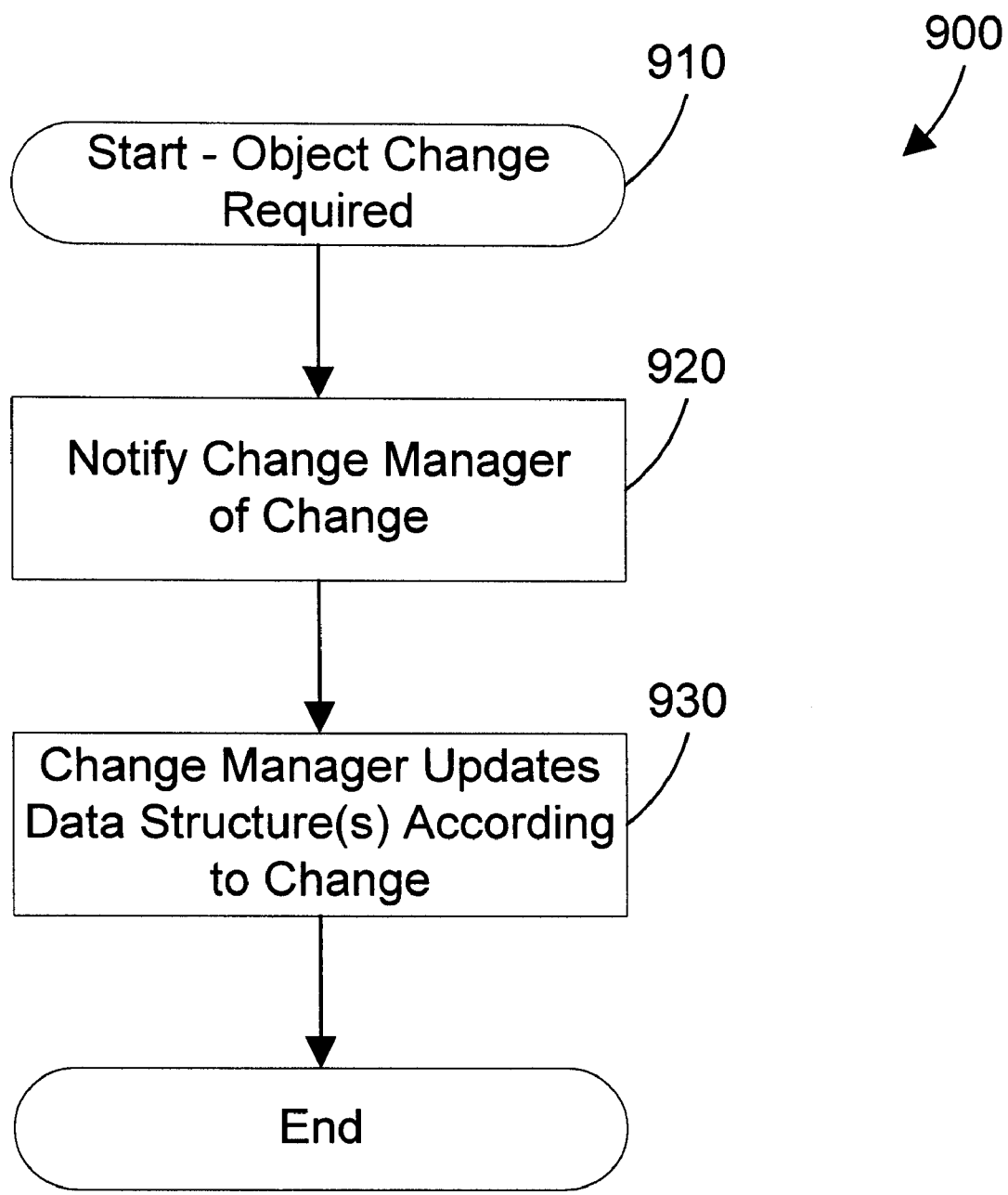
FIG. 9 is a flow diagram of a method in accordance with a preferred embodiment of the present invention.

Referring to FIG. 9, a method 900 in accordance with a preferred embodiment is initiated when a change is required to an object (step 910). For the preferred embodiment, a change to an object is required if the object is registered with resource manager 240, and a change to that object's data is needed. If these conditions are met, resource manager 240 notifies change manager 127 of the needed change (step 920). This notification is performed by resource manager 240 invoking one of the methods afterCreation( ), beforeDeletion( ), beforeChange( ), and afterChange( ) as discussed above. In response to a method call by resource manager 240, change manager 127 determines the appropriate data structure, if any, that corresponds to the requested change, and updates the data structure to reflect the change (step 930).

Note that data structure 128 may be an object oriented data structure, or may be a non-object data structure. If data structure 128 is implemented in objects, change manager 127 may operate directly on the data structure by invoking methods on the objects within the data structure. If, however, the data structure is implemented in a non-object database or procedural program, a system administrator will likely have to program the interaction between change manager 127 and the data structure 128.

If objects are being changed under a transaction, each data structure is assumed to be controlled by a resource manager. This is necessary for normal transaction commit and rollback processing. These resource managers may correspond to resource manager 240, or may correspond to other resource managers not shown in the figures that are part of transaction 220. These resource managers may also use journal 250, or may use their own journals (not shown).

The apparatus and method in accordance with the preferred embodiments thus provides a user-extensible framework for defining a change manager for a particular change management environment. Once the user extends the framework to implement a desired change management environment, all changes to registered objects will be automatically propagated to the appropriate indexes, hash tables, priority queues, or other data structures that correspond to the changed data. A change manager in accordance with the preferred embodiments thus provides automatic system-level changes to indexes or other data structures when an object is changed without any effort on the part of the programmer. Because the changes are propagated to the data structures at the system level, no overhead is imposed on the programmer. Because the change manager is an extensible framework, a programmer may customize the change manager as desired to define a particular change management environment that will meet specific needs. Thus, the invention provides both the system-level reliability of automatic change management along with user-extensibility for flexibility in adapting the change manager to specific requirements.

While the invention has been particularly shown and described with reference to preferred embodiments thereof, it will be understood by those skilled in the art that various changes in form and details may be made therein without departing from the spirit and scope of the invention.

What is claimed is:

1. An apparatus comprising:
   at least one processor;
   a memory coupled to the at least one processor;
   at least one data structure residing in the memory, the at least one data structure containing data relating to a plurality of objects; and
   an object oriented change manager residing in the memory and executed by the at least one processor, the change manager automatically propagating changes to at least one of the plurality of objects to the at least one data structure when at least one object method on the change manager is invoked before changing or deleting the at least one object and after creating or changing the at least one object, the change manager comprising a framework mechanism that is extensible by a user to define a desired change management environment.

2. The apparatus of claim 1 wherein the at least one data structure includes an index.

3. The apparatus of claim 1 wherein the at least one data structure includes a hash table.

4. The apparatus of claim 1 wherein the at least one data structure includes a priority queue.

5. The apparatus of claim 1 wherein the change manager is defined by at least one change manager concrete subclass of an abstract change manager class.

6. The apparatus of claim 5 wherein the change manager class defines the at least one object method on the change manager.

7. The apparatus of claim 6 wherein the at least one method includes:
   an afterCreation( ) method that causes the change manager to update the at least one data structure after a new one of the plurality of objects is created;
   a beforeDeletion( ) method that causes the change manager to update the at least one data structure before one of the plurality of objects is deleted;
   a beforeChange( ) method that causes the change manager to update the at least one data structure before one of the plurality of objects is changed; and
   an afterChange( ) method that causes the change manager to update the at least one data structure after one of the plurality of objects is changed.

8. A method for automatically propagating a change made to at least one of a plurality of objects to at least one data structure containing data relating to the plurality of objects, the method comprising the steps of:
   extending a user-extensible framework mechanism to define a desired change management environment;
   detecting when the at least one object is to be changed;
   notifying a change manager that the at least one object is to be changed by invoking at least one object method on the change manager before changing or deleting the at least one object and after creating or changing the at least one object; and
   the change manager updating the at least one data structure according to the desired change management environment.

9. The method of claim 8 wherein the step of notifying the change manager comprises the step of invoking at least one of the following methods on the change manager:
   an afterCreation( ) method that causes the change manager to update the at least one data structure after a new one of the plurality of objects is created;
   a beforeDeletion( ) method that causes the change manager to update the at least one data structure before one of the plurality of objects is deleted;
   a beforeChange( ) method that causes the change manager to update the at least one data structure before one of the plurality of objects is changed; and
   an afterChange( ) method that causes the change manager to update the at least one data structure after one of the plurality of objects is changed.

10. A method for providing a change management environment in an object oriented system that automatically updates at least one data structure with changes to at least one of a plurality of objects, the method comprising the steps of:
    providing an object oriented change management framework that is extensible by a user to define the change management environment once extended by the user;
    a user extending the object oriented change management framework to define the change management environment; and
    the extended object oriented change management framework executing on a computer system, the object oriented change management framework including a change manager that includes at least one object method that is invoked before changing or deleting an object and after creating or changing an object.

11. The method of claim 10 further comprising the step of a user extending the object oriented change management framework by defining at least one concrete subclass of a change manager class to provide the change management environment.

12. The method of claim 11 wherein the change manager class defines the at least one object method.

13. The method of claim 12 wherein the at least one method includes:
    an afterCreation( ) method that causes the change manager to update the at least one data structure after a new one of the plurality of objects is created;
    a beforeDeletion( ) method that causes the change manager to update the at least one data structure before one of the plurality of objects is deleted;

a beforeChange( ) method that causes the change manager to update the at least one data structure before one of the plurality of objects is changed; and an afterChange( ) method that causes the change manager to update the at least one data structure after one of the plurality of objects is changed.

14. A program product comprising:

an object oriented change manager that automatically propagates changes to at least one of a plurality of objects to at least one data structure containing data relating to the plurality of objects when at least one object method on the change manager is invoked before changing or deleting the at least one object and after creating or changing the at least one object, the change manager comprising a framework mechanism that is extensible by a user to define a desired change management environment; and signal bearing media bearing the object oriented change manager.

15. The program product of claim 14 wherein the signal bearing media comprises recordable media.

16. The program product of claim 14 wherein the signal bearing media comprises transmission media.

17. The program product of claim 14 wherein the framework mechanism defines a desired change management configuration when a user extends the framework mechanism by defining at least one concrete subclass of a change manager class.

18. The program product of claim 14 wherein the change manager class defines the at least one method on the object oriented change manager.

19. The program product of claim 18 wherein the at least one method includes:

an afterCreation( ) method that causes the change manager to update the at least one data structure after a new one of the plurality of objects is created;

a beforeDeletion( ) method that causes the change manager to update the at least one data structure before one of the plurality of objects is deleted;

a beforeChange( ) method that causes the change manager to update the at least one data structure before one of the plurality of objects is changed; and an afterChange( ) method that causes the change manager to update the at least one data structure after one of the plurality of objects is changed.

* * * * *